United States Patent
Giacona et al.

(10) Patent No.: US 7,500,503 B2
(45) Date of Patent: Mar. 10, 2009

(54) APPARATUS FOR ASSEMBLING TIRE AND WHEEL

(75) Inventors: Ben Giacona, Grosse Pointe Woods, MI (US); Dan Pellerin, Howell, MI (US)

(73) Assignee: Schencky Rotec Corporation, Orion, MI (US)

( * ) Notice: Subject to any disclaimer, the term of this patent is extended or adjusted under 35 U.S.C. 154(b) by 0 days.

(21) Appl. No.: 11/467,751

(22) Filed: Aug. 28, 2006

(65) Prior Publication Data

US 2008/0047670 A1    Feb. 28, 2008

(51) Int. Cl.
    *B60C 25/132*      (2006.01)
(52) U.S. Cl. .................................. 157/1.17; 157/1.24
(58) Field of Classification Search ............. 157/1, 157/1.1, 1.17, 1.22, 1.24, 1.2
See application file for complete search history.

(56) References Cited

U.S. PATENT DOCUMENTS

| | | | |
|---|---|---|---|
| 3,557,862 A | 1/1971 | Mains | |
| 3,978,903 A * | 9/1976 | Mueller et al. | 157/1.2 |
| 4,019,553 A | 4/1977 | Lefgren | |
| 4,163,468 A * | 8/1979 | Mueller | 157/1.17 |
| 4,235,275 A | 11/1980 | Sons, Jr. | |
| 4,258,771 A | 3/1981 | Snyder | |
| 4,262,727 A * | 4/1981 | Schifferly | 157/1.24 |
| 5,141,040 A * | 8/1992 | Curcuri | 157/1.17 |
| 5,222,538 A * | 6/1993 | Tomita et al. | 157/1 |
| 6,029,716 A | 2/2000 | Hawk | |
| 2004/0177496 A1 * | 9/2004 | Pellerin et al. | 157/1.1 |
| 2005/0000662 A1 | 1/2005 | Schmatz et al. | |
| 2005/0006031 A1 * | 1/2005 | Pellerin et al. | 157/1.17 |

* cited by examiner

*Primary Examiner*—Hadi Shakeri
(74) *Attorney, Agent, or Firm*—Howard & Howard Attorneys PLLC

(57) ABSTRACT

An apparatus of the present invention is designed for assembling tires having a pair of spaced beads of various diameters and configurations with the respective wheels having a pair of seats moveable by a conveyor along an assembly path. A mounter station is disposed on the conveyor and presenting an alignment axis. A sealing mechanism is cooperable with the mounter station and is moveable around the alignment axis by a drive unit connected thereto for forcing at least one of the beads of the tire between the seats of the wheel. The apparatus accommodates a wide variety of wheel and tire sizes, is not complex and bulky, and reduces number of parts required to form the apparatus.

4 Claims, 7 Drawing Sheets

APPARATUS FOR ASSEMBLING TIRE AND WHEEL

FIELD OF THE INVENTION

The subject invention relates to an apparatus for mounting a tire and wheel assembly.

BACKGROUND OF THE INVENTION

Motor vehicles are commonly supported by pneumatic tires supported on respective wheels, i.e. a tire and wheel assembly. The tire and wheel assembly is among the most important parts of the motor vehicle. Everything concerned with driving, such as moving and stopping of the motor vehicle, involves the tire and wheel assembly. It is well known that a non-uniformed, i.e. improperly mounted and inflated tire and wheel assembly contributes significantly to noise and vibration of the motor vehicle. A tire and wheel assembly that is not properly mounted and inflated results in what is commonly referred to as smooth road shake, resulting in the undesirable vibration of the motor vehicle. If beads of the tire are not properly seated on seats of the wheel, air pressure over, for example 25 psi, may cause the bead to break and the tire and wheel assembly to explode during operation.

Typically, the mounting of the tire on the wheels by automobile manufacturers is normally accomplished by various high production assembly lines. These assembly lines, known in the art, contain conveying means, such as conveyor belts or metal rollers making it possible to move the tires and the wheels, respectively, from one point to another on the assembly line. The tires and wheels are delivered from a supply warehouse on suitable pallets to be further mounted on the assembly line and delivered to customers. The tires and wheels are typically treated by the lubrication solution or soap before the tire is installed on the respective wheel and is inflated.

Various methods and machines have been devised for seating the bead of the tire on or between the seats of the wheel and/or inflating the same. The objective, however, is always to ensure that the bead of the tire are properly seated on the seats of the wheel and are properly inflated to ensure proper functioning of the tire and wheel assembly. The art is replete with various methods and apparatuses for inflating and/or mounting a tire and wheel assembly, which are disclosed in the U.S. Pat. Nos. 4,735,250 to Kane; U.S. Pat. No. 5,339,880 to Kawabe et al.; U.S. Pat. No. 6,502,618 to Kane et al.; U.S. Pat. No. 6,463,982 to Doan; U.S. Pat. No. 6,467,524 to Ronge et al.; U.S. Pat. No. 6,148,892 to Koerner et al.; and U.S. Pat. No. 6,029,716 to Hawk and are widely used today in the automotive industry.

The U.S. Pat. No. 6,029,716 to Hawk, for example teaches an apparatus for inflating a tire and wheel assembly having an inflator head movable vertically to and from a wheel rim of the assembly. The inflator includes first and second chamber flanges aligned axially one with the other. The chamber flanges having fixed first and second diameters with the first diameter being larger than the second diameter thereby permitting the second inflation chamber to fit the bead of the tire a larger size. Two rollers of the apparatus are designed to push the tire over the rim. Each roller is moved relative the first and second chambers at only two fixed distances thereby diminishing capability of the apparatus to assemble the tire of multiple configurations.

Hence practicable, the prior art designs are too complex, non-compact and fit only to be installed and used within established environment of a production line to mount the tires within their respective wheels to undergo further inflation. These prior art designs are limited to two tire sizes dependent upon the diameters of the first and second chambers, as for example the apparatus taught by the U.S. Pat. No. 6,029,716 to Hawk, thereby diminishing flexibility of wheel assembly application which is a prime in a modern manufacturing environment.

But even with the aforementioned technique, to the extent it is effective in some respect, there is always a need for an improved system for mounting tires with and without tubes about wheels of various configurations and diameters to form a tire and wheel assembly and to provide a clearance between the tire and the wheel thereby preventing damage of the tire and the tube disposed inside the tire as the tire is assembled with the wheel.

SUMMARY OF THE INVENTION

An apparatus of the present invention is designed for assembling a tire having a pair of beads on a wheel having a hub portion and a pair of seats by forcing the beads of the tire between the seats of the wheel for forming a tire and wheel assembly to be installed on automotive vehicles and motorcycles. A continuous conveyor of the apparatus presents opposite sides defining an assembly path and an alignment axis. A loading station for loading the wheels thereon and a soaping station for lubrications the tires, before the tires are placed on the respective wheels, are positioned along the assembly path. A mounter station is located on the conveyor downstream from the loading and lubrication stations. The mounter station is adaptable for mating the tire with the respective wheel to form the tire and wheel assembly. The mounter station has a deck portion moveable up and down as the wheel is oriented for assembly with the tire and a plurality of adapter plates engaged on the conveyor and movable along the assembly path. A centering pin of the adapter plate receives the respective wheels thereon and centering the wheel before mating with the tire. Alternatively, the single adapter plate may be positioned at the loading station for centering the wheel relative the assembly path and for prepositioning the wheel before assembly with the tire. The conveyor extends through the deck portion. A first drive unit is disposed in the mounter station and connected to a push-down tool thereby moving the push-down tool (the tool) vertically to and from the adapter plate to engage the hub portion of the wheel and to force the wheel to the deck portion to prevent movement of the wheel relative the deck portion. A first roller and a second roller are connected to the mounter station and are rotated about the tool for forcing the beads of the tire between the seats of the wheel. The first and second rollers are connected to a second drive unit to facilitate circular movement of the first and second rollers about the tool. In particular, the first roller is slidable about the upper seat of the wheel and the second roller is rotatable about the tire for forcing the bead of the tire between the seats of the wheel. The first and second rollers are rotatable in unison about the tool and are also moveable radially one from another and the tool to facilitate assembly of the tires and the wheels of various diameters and configurations.

The apparatus of the present invention includes a tire pusher device and a hold-down shoe both mounted to the conveyor and movable relative the deck portion for forcing the tire to an alignment axis and lifting the tire upwardly to form a clearance between at least one of the beads and the seat as the tool rotates about the alignment axis for preventing tension of the at least one of the beads thereby continuously forcing the beads of the tire between the seats of the wheel.

The tire pusher and the hold-down show are manually operated or may be operably communicated with a controller. A brake device fluidly communicates with a source of fluid supply and is disposed inside the mounter station. The brake device is movable along the alignment axis between the first and second rollers to allow adjustable movement between the first and second rollers to facilitate assembly of the tires and the wheels of various configurations and diameters.

Alluding to the above, the following sequence of operation ensures proper assembly of the tires and the wheels of various diameters and configurations and the tube if required. As one of the operators positions the wheels on the respective adapter plates, the other operator lubricates the tires at the soaping station adjacent the conveyor. As the pre-centered wheels are consecutively movable along the assembly path and enter the deck portion, the operator places the lubricated tire on the wheel and the hold-down device is moved into a wheel engaging position for holding the tire positioned on the wheel against the deck and preventing movement of the wheel relative the conveyor. The second drive unit rotates the first and second rollers around the alignment axis for forcing the beads of the tire between the seats of the wheel. The second drive unit also facilitates radial movement of the first and second rollers as disclosed above.

An advantage of the present invention is to provide an improved design of an apparatus for mounting a tire and wheel assembly that is compact and has a wide application range from an individually owned tire shop, a private garage, or the like.

Another advantage of the present invention is to provide an apparatus capable of accommodating a wide variety of wheel and tire sizes without modifying the apparatus.

Still another advantage of the present invention is to provide an improved design of a tire mounting apparatus that is not complex and bulky in design and integrates a pair rollers movable relative to one another thereby reducing number of parts required to form the apparatus.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
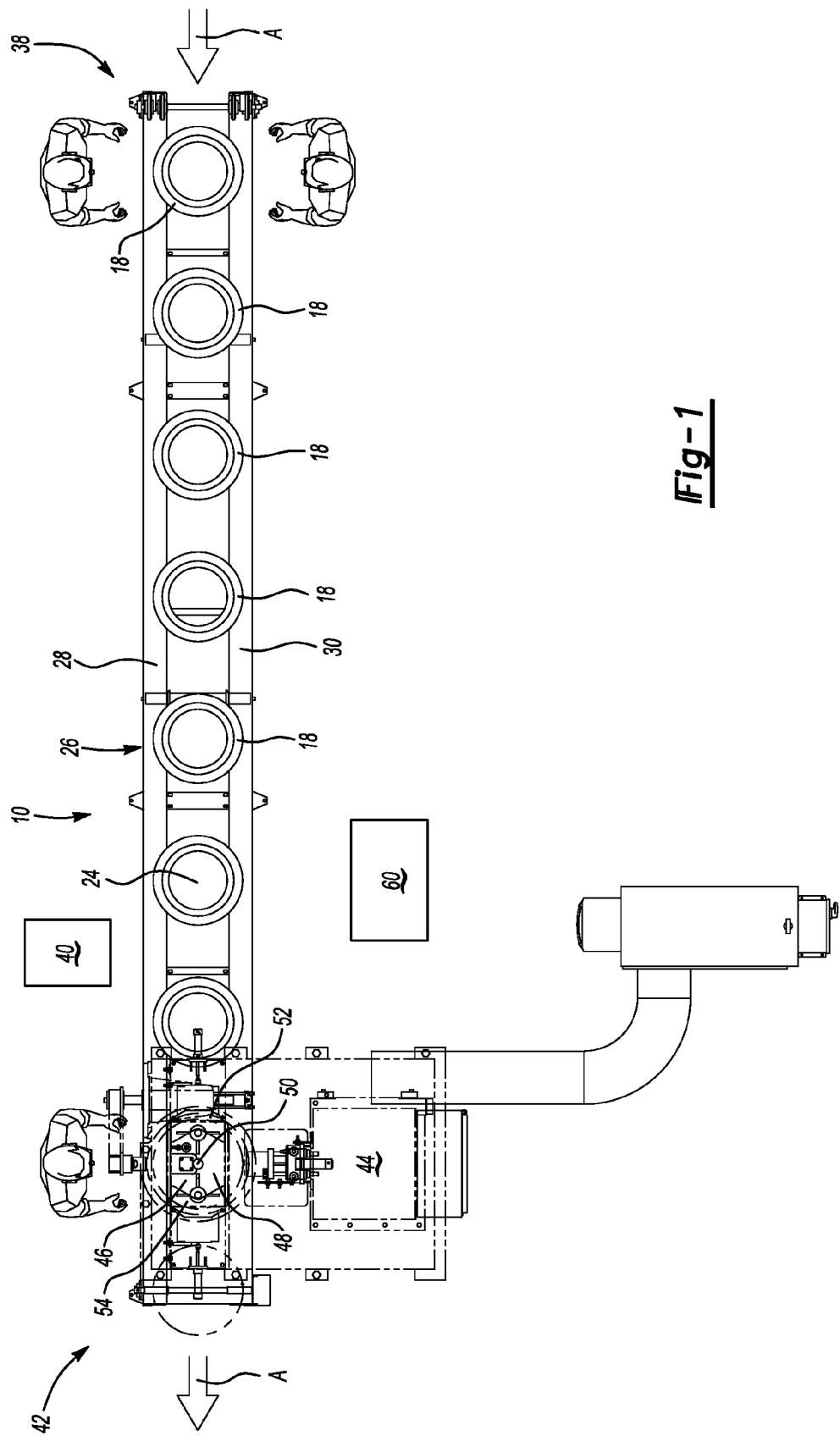
FIG. 1 is a general view of an apparatus for mounting a tire and wheel assembly.

Referring to the Figures, wherein like numerals indicate like or corresponding parts, an apparatus of the present invention is generally shown at 10. The apparatus 10 is designed for assembling a tire 12 having a pair of beads 14, 16 on a wheel 18 having a pair of seats 20, 22 surrounding a hub portion 24 by forcing the beads 14, 16 of the tire 12 between the seats 20, 22 of the wheel 18. The apparatus 10 is capable of mounting the tires 12 and the wheels 18 of various diameters and modifications, both tubeless and ones with a tube disposed inside the tire 12 and used for both motorcycles, automotive vehicles of all types (not shown).

Figure 2:
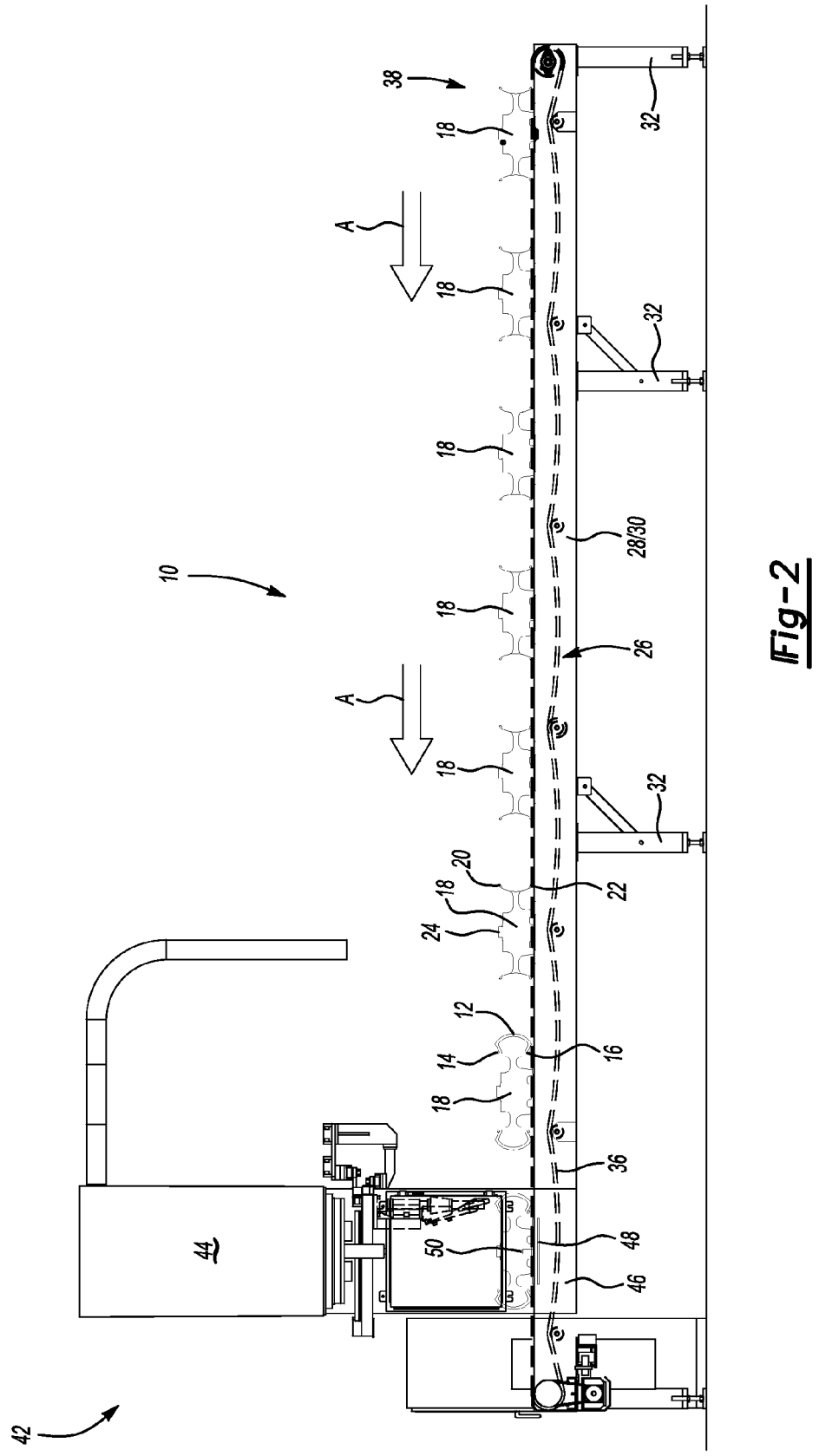
FIG. 2 is a side view of the apparatus of FIG. 1.
Figure 7:
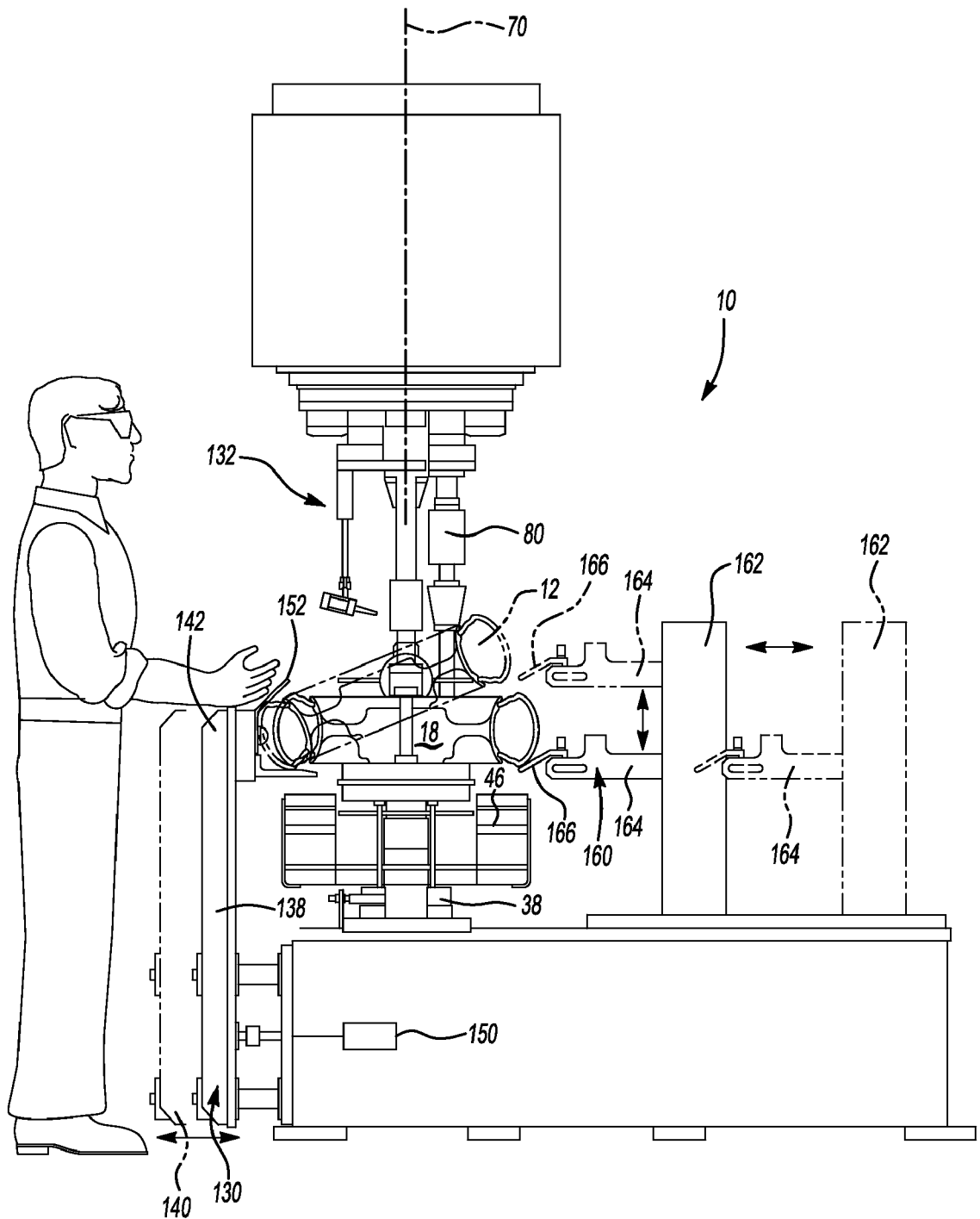
FIG. 7 is a side and partial view of the apparatus illustrating a device adaptable for orienting the tire about the wheel and pushing the tire to the wheel during assembly process.

The apparatus 10 includes a work surface defined by a frame, generally indicated at 26, which has opposite side walls 28, 30 and a plurality of supports 32, as best shown in FIG. 2, extending downwardly from the frame 26 to a floor 34. A continuous conveyor belt 36 (the conveyor) is disposed about the frame 26 movable along an assembly path A. A loading station, generally shown at 38 and a soaping station, generally shown at 40, are disposed adjacent the conveyor 36 and along the assembly path A. A mounter station, generally shown at 42, is located on the conveyor downstream from the loading and lubrication stations 38 and 40. The mounter station 42 is adaptable for mating the tire 12 with the respective wheel 18 to form a tire and wheel assembly. The mounter station 42 has a tower 44 and a deck portion 46 moveable up and down as the wheel 18 is oriented for the assembly with the tire 12, as best shown in FIG. 7. An adapter plate 48 is disposed at the deck portion 46 and adaptable to move above and below the deck portion 46 for centering the wheel 18 relative the assembly path A and for pre-positioning the wheel 18 before assembly with the tire 12. The conveyor belt 36 extends through the deck portion 46. A centering pin 50 of the adapter plate 48 is oriented to receive the respective wheel 18 thereon and centering the wheel 18 before the mating with the tire 12. Alternatively, a plurality of the adapter plates (not shown) are connected to the conveyor 36 and are movable along the assembly path A for engaging the respective wheels 18. The configuration, number and location of the adapter plates 48 are not intended to limit the scope of the present invention. A pair of light curtains 52 and 54 are disposed at the deck portion 46 for identifying the wheel 18 in a manner known to those skilled in the art.

A controller 60 is connected to the light curtains 52 and 54 to receive information about the wheel 18 and/or the tire 12. The controller 60 is in electronic communication with the mounter station 42. The controller 60 includes a computer having an input/output interface, a central processor unit, a random access memory, i.e. RAM, and a read only memory, i.e. ROM. The input interface is electrically connected with the mounter station, loading station, and the respective components of the same. The controller 60 is pre-programmed with the various tire 12 and wheel 18 sizes to be mounted. The ROM stores a program, i.e. a comparative software that determines proper amount of air to be inflated into particular tire 12 mounted on the wheel 18. The controller 60 is preferably installed at a operational point. Alternatively, the controller may be positioned adjacent the frame 26, as shown in FIG. 1.

Figure 3:
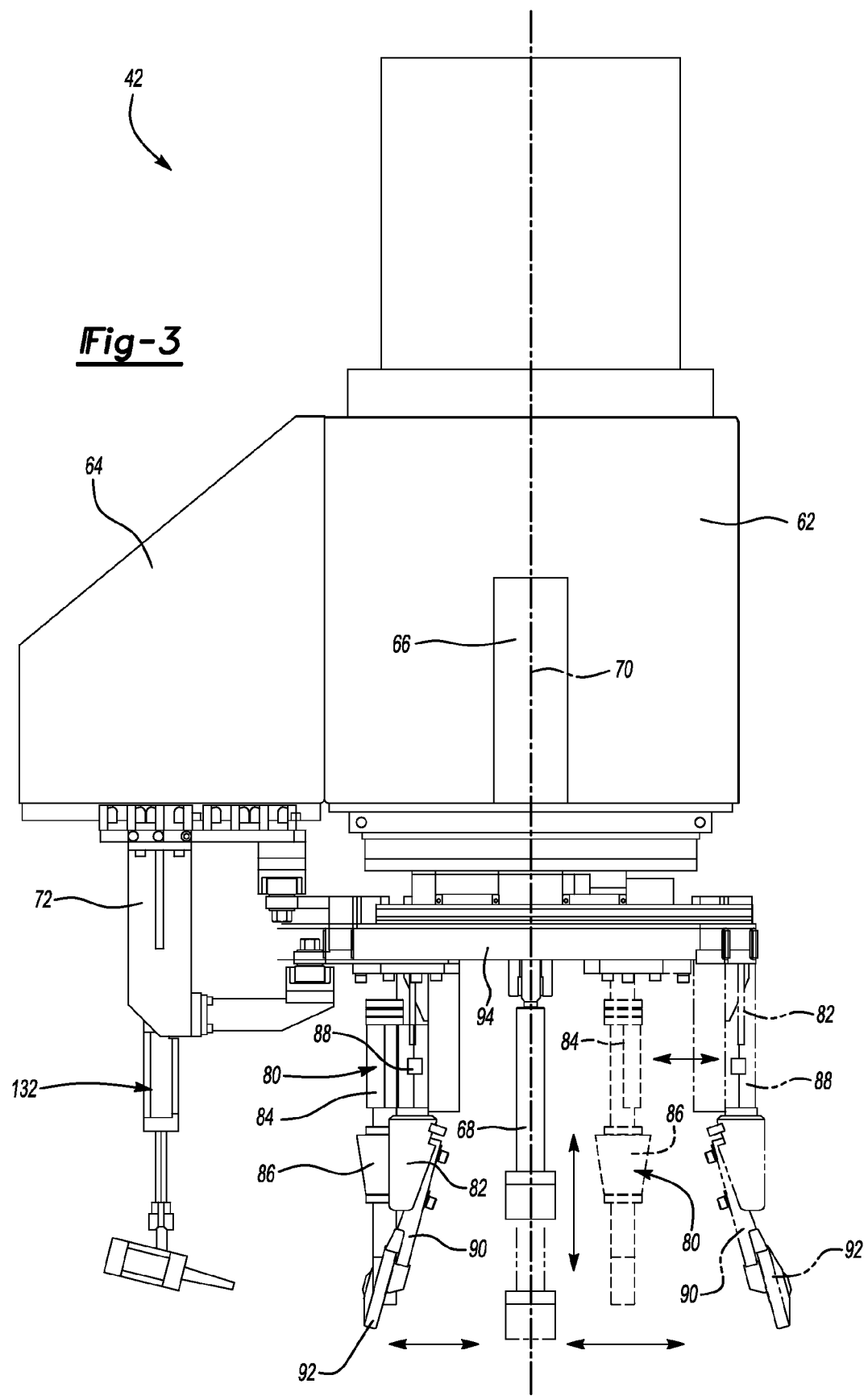
FIG. 3 is a side view of a mounter unit of the apparatus having a tool extending vertically for holding the wheel against a deck portion for preventing relative movement of the wheel and a sealing device having a pair of rollers rotatable in unison with one another around the tool and movable radially from one another to accommodate the tires and wheels of various diameters and configurations.

As illustrated in FIG. 3, the mounter station 42 includes a first housing 62 having a generally rectangular shape and a second housing 64 rigidly connected to one of the sides of the first housing 62. Alternatively, the second housing 64 is rotatable about the first housing 62. A first drive unit 66 is disposed in the first housing 62 and is connected to a push-down tool 68 thereby moving the push-down tool 68 vertically along an alignment axis 70 to and from the adapter plate 42 for engaging the hub portion 24 of the wheel 18 and for forcing the wheel 18 to the deck portion 46 thereby preventing movement of the wheel 18 relative the deck portion 46. The first drive unit 66 may include a servo-motor of the type and any other actuator devices without limiting the scope of the present invention.

The second housing 64 engages a second drive unit 72 disposed herein for moving a pair of rollers, such as a first roller 80, i.e. a tire bead deflector, and a second roller 82, i.e. a press-down-roller, in unison around the alignment axis 70 and radially relative the push-down tool 68 for forcing one of the beads of the tire 12 between the seats of the wheel 18 during the assembly process.

The first and second rollers 80 and 82 are connected to the second drive unit 72 to facilitate circular movement of the first and second rollers 80 and 82 about the alignment axis 70. In particular, the first roller 80 is slidable about the upper seat 20 of the wheel 18 and the second roller 82 is rotatable about the tire 12 for forcing the bead 14 of the tire 12 between the seats 20 and 22 of the wheel 18. The first roller 80 includes a central shaft 84 with a shoulder 86 connected thereto. The second roller 82 includes a shoulder portion 88, an arm 90, and a sealing wheel 92. The arm 90 is connected angularly with respect to the alignment axis 70. The sealing wheel 92 is rotatable circumferentially about the alignment axis 70 and relative to the push-down tool 68 for forcing the beads 14, 16 of the tire 12 between the seats 20, 22 of the wheel 18.

Figure 6:
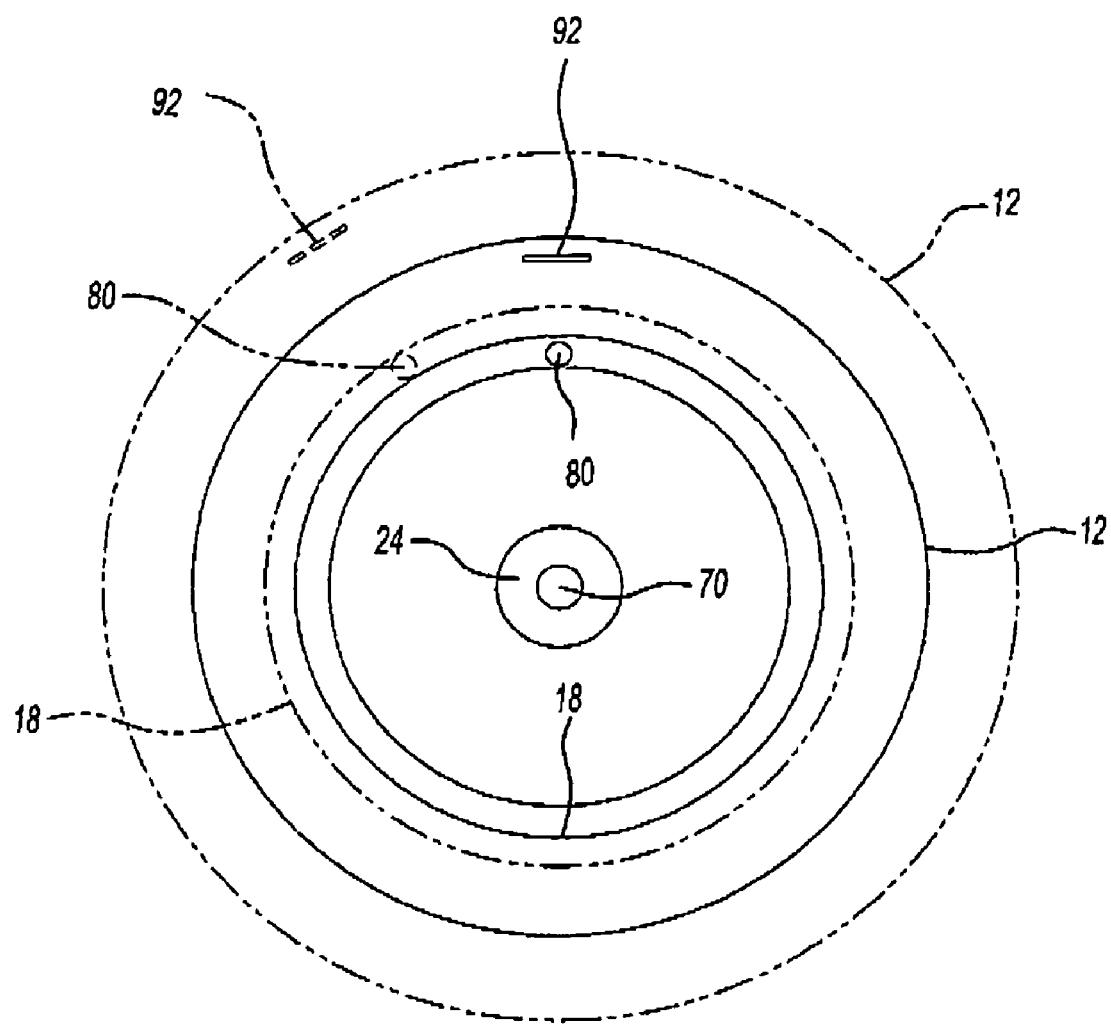
FIG. 6 is a schematic view of the tire and wheel assemblies of two different diameters with one illustrated in phantom and position of the rollers adjustably moveable relative to one and the other to accommodate assembly of the aforementioned tires and wheels.

The first and second rollers 80 and 82 are movable to and from one another and the push-down tool 68 along a common track or rail 94 circumscribing the push-down tool 68. Alternatively, each first and second rollers 80 and 82 are moved along the respective tracks or rails (not shown). The configuration of rails or tracks is not intended to limit the scope of the present invention. As illustrated in FIG. 6, the first and second rollers 80 and 82 are movable in unison with one another to assembly the tire 12 with the wheel 18 of one size, and then, as the wheel 18a and the tire 12a are positioned to be assembled, the first and second roller 80 and 82 are moved radially and away from the push-down tool 68 to assemble the tire 12a and the wheel 18a therewith. The relative radial movement of the first and the second rollers 80 and 82 adds flexibility to modern tire and wheel assembly applications by allowing the mounter station 42 of the present invention to be adaptable to mate wide variety of the tires 12 and the wheels 18 both tubeless and without tubes.

Figure 4:
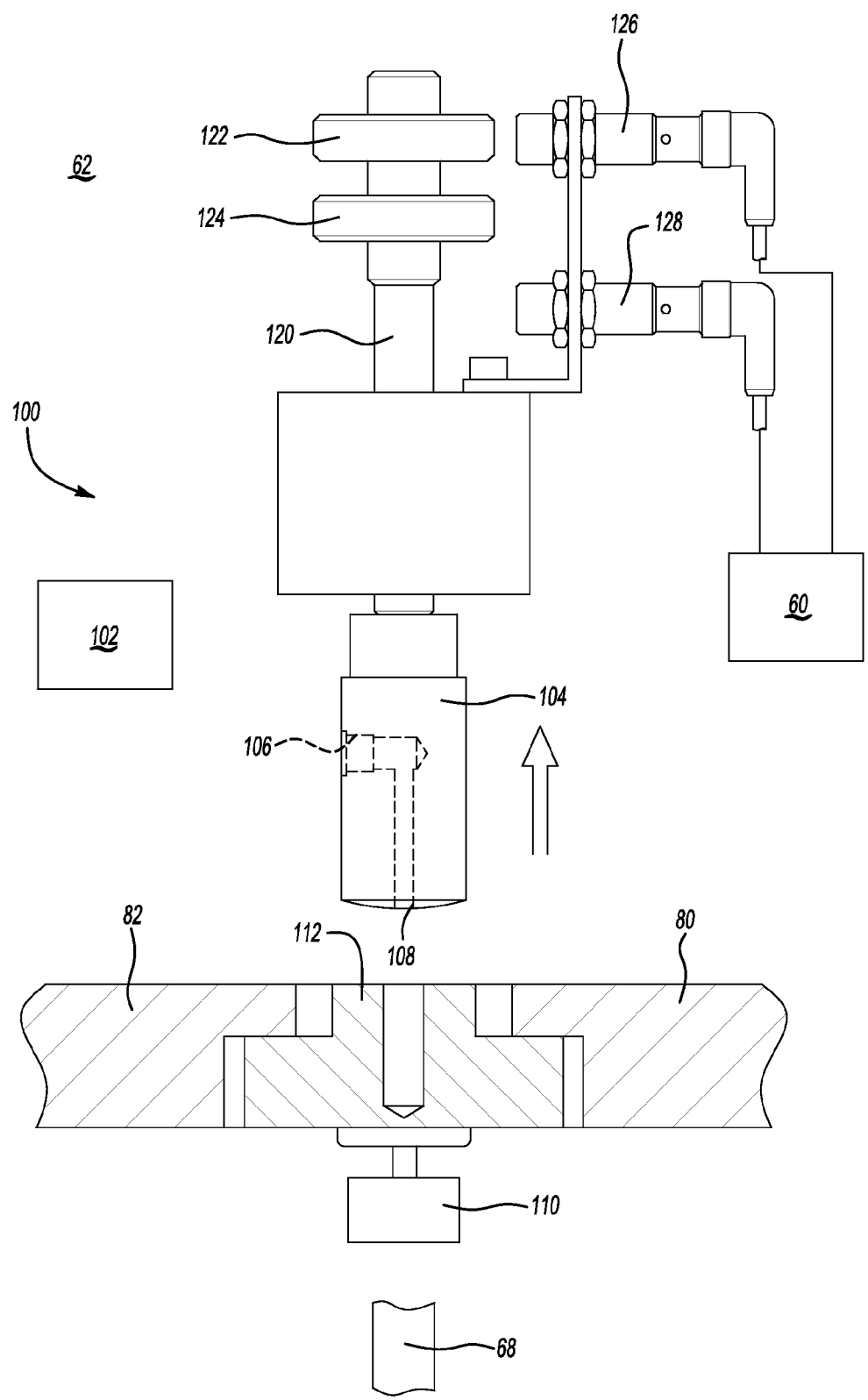
FIG. 4 is a fragmental view of the mounter unit having a brake device shown in a first operational mode.
Figure 5:
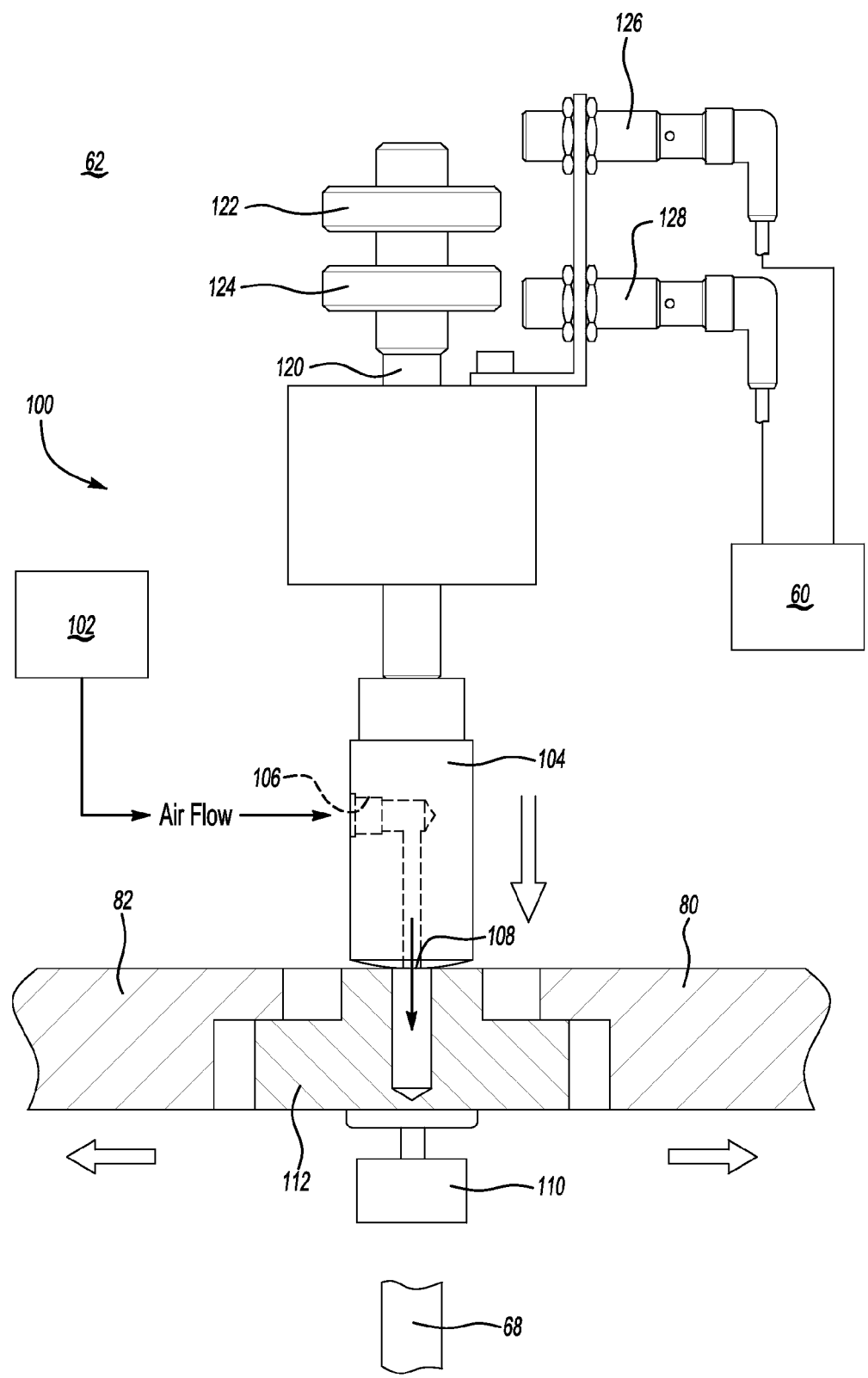
FIG. 5 another fragmental view of the mounter unit with the brake device shown in a second operational mode.

FIGS. 4 and 5 illustrate a unique brake mechanism generally shown at 100 is disposed in the first housing 62 and between the first and second rollers 80 and 82 to allow the relative radial movement of the first and second rollers 80 and 82 relative the push-down tool 68. The brake mechanism 100 is movable between a first mode or a roller disengaging position, as shown in FIG. 5, as the first and second rollers 80 and 82 are moved relative to one another and the push-down tool 68 and a second mode or a roller engaging position, as shown in FIG. 4, thereby preventing the radial rotational movement of the rollers 80 and 82 relative the push-down tool 68 as the rollers 80 and 82 are movable in unison to about the wheel 18 to force the beads 14 and 16 of the tire 12 between the seats 20 and 22 of the wheel 18. The brake mechanism 100 fluidly communicates with a source of a fluid supply 102. A tubular member 104 of the brake mechanism 100 has at least one inlet port 106 and at least one outlet port 108 fluidly communicating with the source of fluid supply 102. A locking member 110 is disposed between the first and second rollers 80 and 82 and has a connecting device 112 engaging the first and second rollers 80 and 82 with one another. The fluid, such as pressurized air, gas, and the like, is injected from the source of fluid supply 102 into the inlet port 106 and then from the outlet port 108 to the connecting device 112 as the tubular member 104 is engaged with the connecting device 112 fluidly communicating with the locking member 110 to activate the connecting device 112 thereby releasing the first and second rollers 80 and 82 moving the rollers 80 and 82 between the roller disengaging position, as shown in FIG. 5, and the roller engaging position, as shown in FIG. 4, wherein the tubular member 104 retracts away from the connecting device 112 thereby preventing fluid supply thereto. The tubular member 104 includes a tail portion 120 having a pair of sensor members 122 and 124 extending radially from the tail portion 120. A pair of sensing devices 126 and 128 are cooperably connected to the brake mechanism 100 and are adjacent the sensor members 122 and 124. The controller 60 operably connects with the sensing devices 126 and 128 for detecting a position of the tubular member 104 relative the connecting device 112 as the sensing devices 126 and 128 detect location of the sensor members 122 and 124 to coordinate fluid injection into the tubular member 104. The configuration of the locking member 110 and the connecting device 112 are illustrated for exemplary purposes to describe the functional aspect of the present invention and are not intended to limit the scope of the present invention.

Alluding to the above, FIG. 7 illustrates the apparatus 10 of the present invention includes a tire pusher device, generally indicated at 130, and a hold-down shoe, generally indicated at 132, and utilized for assembling the tires 12 having a tube (not shown) disposed between the tire 12 and the wheel 18 assembled with one another. The tire pusher device 130 and the hold-down shoe 132 are cooperable with the conveyor and are movable relative the deck portion 46 of the conveyor 38 for forcing the tire 12 to the alignment axis 70 and lifting the tire 12 upwardly relative the deck portion 46 to form a clearance between at least one bead and the seat as the first and second rollers 80 and 82 are rotated about the alignment axis 70 for preventing tension of the beads thereby continuously forcing the beads of the tire 12 between the seats of the wheel 18. The tire pusher 130 and the hold-down shoe 132 are manually operated or may be operably communicated with the controller 60 without limiting the scope of the present invention. The tire pusher 130 is movable relative the deck portion 46 to engage the tire 12 and to force the tire 12 against the wheel 18 to form the clearance between the beads and the seats. A tubular post 138 of the tire pusher 130 extends generally parallel to the alignment axis 70 and presents terminal ends 140 and 142 with one terminal end 140 being cooperable with the conveyor 36 through an actuating mechanism 150 for moving the tubular post 138 relative the conveyor. A bracket 152 is connected to the other terminal end 142 for engaging the tire 12 in a clamping fashion and pushing the tire 12 to the wheel 18 as the first and second rollers 80 and 82 are rotated about the alignment axis 70.

A tilting mechanism is generally indicated at 160 in FIG. 7. The tilting mechanism 160 is utilized for lifting the tire 12 as the first and second rollers 80 and 82 are rotated about the alignments axis 70 for forcing the bead 14 and 16 between the seats 20 and 22. The tilting mechanism 160 is movable to and from the alignment axis 70 and is also movable upwardly and downwardly along the alignment axis 70 and relative the conveyor 36. The tilting mechanism 160 is cooperable with the tire pusher device 130 and is operably moveably in concert to form a clearance between at least one bead and the seat as the first and second rollers 80 and 82 are rotated about the alignment axis 70 thereby preventing tension of the beads 14 and 16 and to continuously force the beads 14 and 16 of the tire 12 between the seats 20 and 22 of the wheel 18. A tower 162 of the tilting mechanism 160 includes an arm 164 extending generally parallel the assembly path A and a lip portion 166 connected to the arm 164 and movable horizontally relative the tire 12 and the wheel 18 and upwardly along the alignment axis 70 for lifting the tire 12 from the adapter plate to assist in forming the aforementioned clearance.

Alluding to the above, the following sequence of operation ensures proper assembly of the tires 12 and the wheels 18 of various diameters and configurations and the tube (not shown) if required. As one of the operators positions the wheels 18 on the respective adapter plates 48 at the loading station 38, the other operator lubricates the tires 12 at the soaping station 40 adjacent the conveyor 36. The wheels 18 may be placed by the operator directly on the conveyor 36 wherein the mounting station 42 is configured with the adapter plate 48 operably disposed therewithin. As the pre-centered wheels 18 are consecutively movable along the assembly path A and enter the deck portion 46, the operator places the lubricated tire 12 on the wheel 18 and the hold-down device 68 is moved into the wheel engaging position for holding the tire 12 positioned on the wheel 18 against the deck portion 46 and preventing movement of the wheel 18 relative the conveyor 36. The second drive unit 64 rotates the first and second rollers 80 and 82 around the alignment axis 70 for forcing the beads 14 and 16 of the tire 12 between the seats 20 and 22 of the wheel 18. The second drive unit 72 also facilitates radial movement of the first and second rollers 80 and 82 as disclosed above.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for mounting tires and wheels of various diameters with each tire having a pair of beads and each wheel having a pair of seats surrounding a hub portion surrounding an alignment axis, said apparatus comprising:

a work surface for supporting the tire and the wheel, said work surface is further defined by a conveyor having side walls and a belt extending about said side walls in a continuous loop;

a mounting device having a deck with said conveyor extending therethrough;

a tool movable in a first direction from an isolated position to a hub engaging position for holding the wheel against said work surface thereby preventing movement of the wheel relative to said work surface wherein said first direction is further defined by a vertical direction said tool is movable along;

a sealing mechanism rotatable around the alignment axis and having two members independently movable in a second direction at various distances relative to one another and said tool and generally perpendicular to said first direction with one member movable about the wheel and the other member movable about the tire for forcing at least one of the beads of the tire between the seats of the wheel, said two members defined by a first roller and a second roller moveable radially relative the alignment axis and relative one and the other;

a first drive unit connected to said tool for moving said tool in said vertical direction and a second drive unit connected to said first and second rollers for moving said first and second rollers in unison around and radially to and from the alignment axis;

a clamping device connected to one of said side walls of said conveyor and movable to and away from the alignment axis for engaging the tire and selectively forcing the tire against the wheel, said clamping device is further defined by a member extending generally parallel to the alignment axis and presenting terminal ends with one terminal end cooperable with one of said side walls slidably movable to and from said side wall and a bracket connected to the other terminal end for engaging the tire and pushing the tire to the wheel; and a tilting mechanism for lifting the tire as said rollers rotated about said tool for forcing the bead between the seats and defined by a tower having an arm extending generally parallel said assembly path and a lip portion connected to said arm and movable horizontally relative the tire and the wheel and upwardly along the alignment axis for partially lifting the tire relative the wheel thereby forming a clearance between the bead and the seat as said second roller rotates about said tool thereby preventing tension and damage of the bead forced between the seats by said second roller.

2. An apparatus as set forth in claim 1 including an adapter plate disposed at said deck for supporting the wheel and a centering pin extending from said adapter plate for centering the wheel in line with the alignment axis, said adapter plate moveable upwardly and above said deck toot as the tire is mounted on the wheel.

3. An apparatus as set forth in claim 1 wherein one of said members is further defined by a shaft and a wheel connected to and positioned angularly with respect to said shaft and rotatable with said shaft circumferentially about the alignment axis for forcing the beads between the seats.

4. An apparatus as set forth in claim 3 wherein said tool is further defined by a slide member for sliding axially to and from the wheel for forcing the wheel to said adapter plate when said first and second rollers are rotated circumferentially relative to the alignment axis and for preventing radial movement of the wheel relative to said adapter plate.

* * * * *

UNITED STATES PATENT AND TRADEMARK OFFICE
CERTIFICATE OF CORRECTION

PATENT NO. : 7,500,503 B2  Page 1 of 1
APPLICATION NO. : 11/467751
DATED : March 10, 2009
INVENTOR(S) : Ben Giacona et al.

It is certified that error appears in the above-identified patent and that said Letters Patent is hereby corrected as shown below:

On the title page, item [73]:

In the Assignee section, please delete "Schencky Rotec Corporation" and add

-- Schenck Rotec Corporation --.

At Column 8, Line 44, please delete "toot" and add

-- tool --.

Signed and Sealed this

Twenty-first Day of April, 2009

JOHN DOLL
*Acting Director of the United States Patent and Trademark Office*